April 21, 1925.

O. R. BRINEY

PISTON STRUCTURE

Filed Sept. 25, 1922

1,534,765

INVENTOR
Ottis R. Briney
BY
C. F. Hinkel
ATTORNEY

Patented Apr. 21, 1925.

1,534,765

UNITED STATES PATENT OFFICE.

OTTIS R. BRINEY, OF PONTIAC, MICHIGAN.

PISTON STRUCTURE.

Application filed September 25, 1922. Serial No. 590,294.

*To all whom it may concern:*

Be it known that I, OTTIS R. BRINEY, a citizen of the United States, and a resident of Pontiac, county of Oakland, and State of Michigan, have invented a new and useful Improvement in Piston Structures, of which the following is a specification.

My invention relates to piston structures generally and to means for sealing the joints between a piston and its rings particularly.

The primary object of my invention is a means for eliminating such disadvantages as oil pumping and consequent fouling of spark plugs, or loss of compression caused by leakage at the piston rings.

A further object is to decrease the cost of production of piston rings and pistons.

A further object is to provide a means for eliminating the above disadvantages which means is readily adaptable to existing pistons and rings.

A further object is to use existing rings and add a lateral pressure means to seal the joint between the piston and the rings.

With these and other objects in view, I illustrate my invention in the accompanying drawings, but it is understood that I do not limit myself to such illustration.

Figure 1:
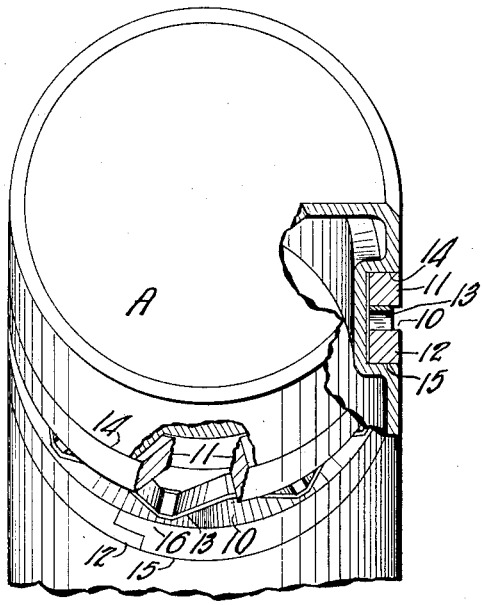
Figure 2:
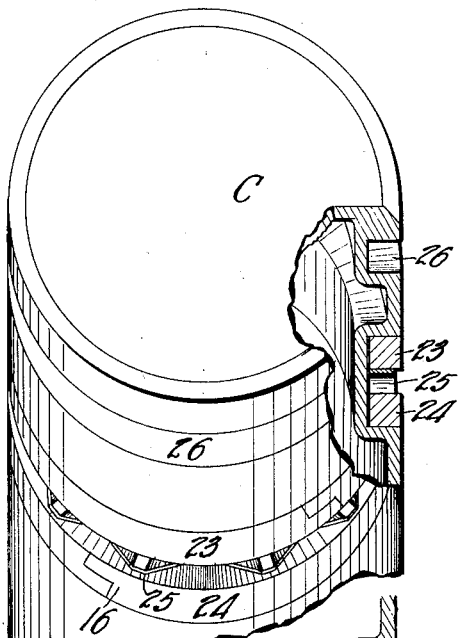
Figure 3:
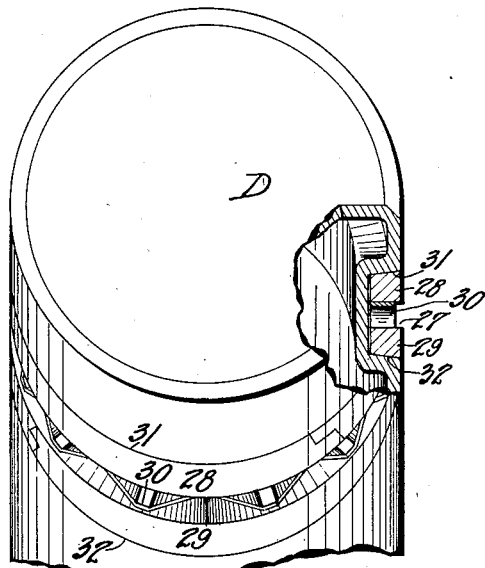
Figures 4, 5:
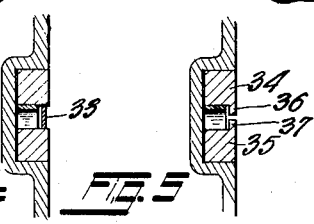

In the accompanying drawings, forming part of this specification, Fig. 1 is a perspective view of a portion of an internal combustion engine piston, partly in section, showing a pair of rings and a spring in one groove; Fig. 2 is a perspective view of a portion of a piston, partly in section, showing one old style piston equipped with the present invention; Fig. 3 is a perspective view of a portion of a piston, partly in section, showing inclined-walls on the groove and on the rings; Fig. 4 is a partial section showing a retainer means for the spring; and Fig. 5 is a partial section showing another retainer means.

Similar reference characters refer to similar parts.

In pistons it is necessary that the rings fit sufficiently tight sidewise to prevent oil pumping and loss of compression.

The usual rings answer that purpose when new, but the sides of these rings as well as the walls of the piston grooves soon wear down due to the constant reversal of the travel of the piston in relation to the engine cylinder, and the piston will then pump oil and permit the escape of compression into the crank case.

The present invention aims to hold the piston rings upon their seats sidewise at all times, thus not only preventing wear thereon but also sealing the joints at all times and also take up any wear which may occur or which may have occurred.

Referring now to the drawings,

The piston A, Fig. 1, has the groove 10 sufficiently deep and wide to accommodate the piston rings 11 and 12 and the spring 13 as shown.

The ring 11 needs to be accurately finished only on the outer circumferential surface and on the face 14 so that this face fits closely to the upper wall of the groove 10. The other faces of the ring 11 need not be finished accurately since they neither fit to another member nor form a seal. This feature reduces the cost of production.

The ring 12 needs to be accurately finished only on the outer circumferential surface and on the face 15 so that this face fits closely to the lower wall of the groove 10. The other faces of the ring 12 need not be finished accurately since they neither fit to another member nor form a seal. This feature also reduces the cost of production.

The spring 13 is made of flat spring steel which is able to withstand high temperatures, is formed as a corrugated annular ring as shown, and is split so that the same may be sprung over the piston and put into position. The spring 13 may, of course, also be formed of material other than steel and having a cross section other than the rectangular cross section shown.

The diameter of the opening in the spring 13, or in other words, the internal diameter of the spring 13 is made only slightly larger than the diameter of the bottom of the groove 10 while the external diameter of the spring 13 is made considerably smaller than the external diameter of the rings 11 and 12. This relation of diameters prevents the spring 13 from scoring the cylinder walls since the inner clearance between the opening in the spring and the bottom of the groove does not permit the spring to move far enough outward to touch the cylinder wall.

When inserting the spring 13, one of the high points of the corrugations should be placed a short distance back of the ring joint as shown at 16.

The object of this spring is to force the rings 11 and 12 laterally or sidewise against the faces 14 and 15, respectively, and thereby seal the joints there.

The rings 11 and 12 have sufficient inherent tension to force themselves radially outward against the cylinder wall as is common in piston rings, and the spring 13 has sufficient inherent tension to force the rings against their respective seats without interfering with their tendency to expand radially. Instead of the inherent tendency to spring outward, as mentioned, the rings may be provided with an external spring means.

It has been found in practice that the rings, with the spring in place, may be closed in to a diameter slightly less than the diameter of the cylinder bore, and that they will be held in this closed position by the spring as long as the piston is handled carefully, but they will readily expand radially as soon as a slight jar or vibration is created in the piston. This feature permits of easy introduction of the piston into the cylinder with the rings in place and eliminates the decided disadvantage of closing in the rings while inserting the piston into the cylinder. After the piston with the closed in rings is inserted into the cylinder, a sharp rap, on the connecting rod for instance, creates sufficient vibrations in the piston to cause the rings to expand radially against the cylinder wall. The continued vibrations of the engine, while running, creates sufficient vibrations in the piston to prevent the spring from holding the rings in any position away from the cylinder wall.

The piston C, Fig. 2, is of the usual type now generally used and originally had three grooves. In this case, the wall between the two lower grooves is cut away, thus forming one wide groove there. The original rings 23 and 24 are here retained and are inserted into their original places and the corrugated annular spring 25 is placed between these rings, thus occupying the space produced by the removal of the wall between the two lower grooves. The ring which originally occupied the upper groove 26 may now be either left out as shown or put back into this groove as desired.

With this arrangement, old and leaky pistons can readily be made tight.

The piston D, Fig. 3, has the groove 27 sufficiently wide and deep to accommodate the rings 28 and 29 and the spring 30. In this instance, the faces 31 and 32 are inclined.

In some cases, the tension required in the spring, to force the rings laterally or sidewise against their seats sufficiently tight to prevent leakage, may be so great that the inherent tension of the rings to expand radially is not sufficiently strong to overcome the friction between the side of the ring and the wall of the groove and thereby prevent the rings from properly expanding radially.

In such cases, the faces 31 and 32 are inclined to such an extent that the action of the spring 30 also helps to force the rings 28 and 29 radially outward and thereby not only seal the joints at 31 and 32 but also the outer circumferential surface of the rings and the cylinder wall.

Due to the rapid and sharp vibrations usually found in internal combustion engines, the spring between the piston rings may break in two or more places and the sharp edges, produced by such breaks, may cut into the cylinder wall.

To prevent these edges from coming in contact with the cylinder wall, the retainer 33, Fig. 4, may be employed. This retainer fits loosely between the piston rings and over the spring and prevents the parts of the spring from moving outward.

Another modification of a retainer means is shown in Fig. 5 where the rings 34 and 35 have annular projections 36 and 37, respectively, which prevent the spring or parts thereof from coming in contact with the cylinder wall.

In order to protect the rings from excessive heat, they are mounted some distance from the upper end of the piston.

It will be seen that the present invention provides an efficient and inexpensive means for sealing either old or new pistons and reduces the cost of production of the rings and the pistons since they need not be finished as accurately as formerly.

It is thought that the five applications of the present invention shown and described are sufficient to enable others to fully understand this invention and apply the same to other types of pistons and rings without effecting interchangeability.

Other modifications than those shown may be made within the scope of the appended claim. Therefore, without limiting myself to the precise construction shown and described,

I claim:—

In combination, a piston provided with a groove having side walls, a pair of piston rings in said groove and one side of each ring bearing against one of said walls, a spring acting laterally against said rings, and a retainer over said spring and between said rings.

OTTIS R. BRINEY.